United States Patent
Chuah

(10) Patent No.: US 11,409,803 B2
(45) Date of Patent: Aug. 9, 2022

(54) RANKING SYSTEM

(71) Applicant: Wesley Seng Chew Chuah, Penang (MY)

(72) Inventor: Wesley Seng Chew Chuah, Penang (MY)

(*) Notice: Subject to any disclaimer, the term of this patent is extended or adjusted under 35 U.S.C. 154(b) by 0 days.

(21) Appl. No.: 16/440,410

(22) Filed: Jun. 13, 2019

(65) Prior Publication Data
US 2019/0294640 A1    Sep. 26, 2019

Related U.S. Application Data

(63) Continuation-in-part of application No. 14/782,430, filed as application No. PCT/MY2014/000041 on Mar. 27, 2014, now abandoned.

(30) Foreign Application Priority Data

Apr. 3, 2013  (MY) ................................ 2013001185

(51) Int. Cl.
*G06F 16/903* (2019.01)
*G06F 16/955* (2019.01)
*G07C 13/00* (2006.01)
*G06F 21/31* (2013.01)
*G06F 16/9538* (2019.01)
*G06Q 30/02* (2012.01)

(52) U.S. Cl.
CPC .... *G06F 16/90335* (2019.01); *G06F 16/9538* (2019.01); *G06F 16/9558* (2019.01); *G06F 21/31* (2013.01); *G06Q 30/0282* (2013.01); *G07C 13/00* (2013.01)

(58) Field of Classification Search
CPC .... G06F 16/9558; G06F 16/958; G06F 21/31; G06Q 30/0282; G06Q 30/0203; G06Q 30/0201
See application file for complete search history.

(56) References Cited

U.S. PATENT DOCUMENTS

| 10,366,399 B1* | 7/2019 | Rahmani ................ G06Q 10/00 |
| 2005/0080668 A1* | 4/2005 | Rothman ................ G06Q 30/02 705/14.4 |

(Continued)

OTHER PUBLICATIONS

Claims filed in U.S. Appl. No. 14/782,430 on Nov. 29, 2018 (Year: 2018).*

*Primary Examiner* — William Spieler
(74) *Attorney, Agent, or Firm* — Preston Smirman; Smirman IP Law, PLLC

(57) ABSTRACT

A system for ranking a plurality of items comprising an online platform capable of displaying a list showing ranking of the items, a voting link generating module for generating a voting link that is assigned to a specific item to allow a vote to be cast thereon following a specific action performed on the voting link, a ranking engine for determining ranking of the items through updating and/or repositioning the items on the list upon receiving the vote, and one or more servers having a processor for managing processes executed by the system, wherein the voting link is configured to be inserted and displayed on a third-party platform managed by a third-party server to readily interact and receive the specific action for the vote to be cast on the item from users browsing the third-party platform without having the user to visit the online platform of the system.

16 Claims, 8 Drawing Sheets

(56) References Cited

U.S. PATENT DOCUMENTS

| | | | |
|---|---|---|---|
| 2008/0215349 A1* | 9/2008 | Baran | G06Q 10/10 705/1.1 |
| 2009/0037351 A1* | 2/2009 | Kristal | G06Q 10/04 706/12 |
| 2009/0083314 A1* | 3/2009 | Maim | G06F 40/194 |
| 2009/0198585 A1* | 8/2009 | Wollstein | G06Q 30/08 705/26.1 |
| 2011/0047013 A1* | 2/2011 | Mckenzie, III | G06Q 10/10 705/14.4 |
| 2013/0211944 A1* | 8/2013 | Momin | G06Q 30/06 705/26.2 |
| 2013/0226623 A1* | 8/2013 | Diana | G06Q 10/10 705/4 |
| 2014/0067579 A1* | 3/2014 | Herger | G06Q 30/06 705/26.1 |
| 2014/0344230 A1* | 11/2014 | Krause | G06F 16/1744 707/693 |
| 2015/0220580 A1* | 8/2015 | Pitsos | G06F 16/35 707/690 |
| 2016/0048519 A1* | 2/2016 | Chuah | G06F 16/9535 707/733 |

* cited by examiner

RANKING SYSTEM

CROSS-REFERENCE TO RELATED APPLICATION

The instant application is a continuation in part of U.S. patent application Ser. No. 14/782,430 filed. Oct. 5, 2015, pending, which is a national phase of PCT International Patent Application Serial No. PCT/MY2014/000041 filed Mar. 27, 2014, and which claims priority to Malaysian Patent Application Serial No. PI 2013001185, filed Apr. 3, 2013, the entire specifications of all of which are expressly incorporated herein by reference.

FIELD OF THE INVENTION

The disclosure below relates to a ranking system that is integrated with a voting system which allows voting activity to be performed on a third-party platform that is administered by a third-party server.

BACKGROUND OF THE INVENTION

The fast developing technology sees the emergence of various voting systems used to determine rankings for identifying and tracking the popularity or preferences of a certain population towards a subject. Several online ranking platforms are integrated with tailored voting solutions that are designed to meet specific requirements of different types of organization. For instance, brand ranking platforms provide voting system to examine the effect and favoritism of the public on a choice or a brand. Such voting system reflects responses of the public towards a brand and the rankings provide at-a-glance answers to questions on the popularity of brands in an industry.

Most existing online ranking platforms come in the form of a voting-enabled website which displays rankings of various categories. Voting modules are available on the website for visitors of the website to select a choice from a list. Once a selection is made, the rankings would be updated to exhibit the latest voting results. Such voting systems work like a conventional online poll system. A prior art employing similar methodology in producing rankings is described in EP 2126722. The system of this patent is a digital content hosting web site having a user interface for displaying a set of digital content items to be collaboratively ranked. The user interface comprises a plurality of digital content rows, wherein each digital content row has a ranking cell displaying a relative ranking position of the digital content item associated with the row. Voting of a digital content could be done through clicking on a first button adapted to increase a ranking position of the digital content item. Conversely, a second button is adapted to decrease a ranking position of a digital content. There is an element adapted to display the numerical change of ranking positions for the digital content.

While registration is not compulsory for most of these systems, ranking platforms which values the accountability of the results requires voter authentication. Some platforms even assign weights for votes depending on the voter's identity or status in its platform. An example of such system that collects online votes is disclosed in EP2174220. The system comprises a server connected to a network, a database connected to the server, and a voter computer connected to the network. The voter computer is configured to register with the server using a profile prior to being able to make a selection among a plurality of options given by the server. The database stores information concerning past activity associated with a voter profile. The past activities associated to the voter profile are used to determine the value of the vote cast by the user of the voter computer.

The major limitation of the prior arts described above is that voters are required to visit the interface of the platform in order to cast their votes. Voters are required to know the address of the platform or conduct a search through the search engines in order to locate the platform. Else, a lot of effort is needed to create awareness of the existence of the platform to direct traffic to it. By having the voting system available only in the platform, there is a high possibility that internet users would find it inconvenient and hence not interested in visiting the platform for casting vote. Such voting and ranking system causes the credibility of the ranking results to be questionable, especially for little known platforms having limited visitors as the results would only reflect the choices of a small amount of people, and therefore no be applicable to represent the responses of a large population towards the choices. Moreover, creation of brand awareness via such brand ranking platforms which also serve as a brand centric website for brand owners to promote their brands would fail with such little traffic visiting the platform.

The present invention aims to provide a solution to the drawbacks of current ranking platforms through enabling voting to be conducted via a variety of channels. Such system is targeted on brand centric websites which provides indication on the popularity of brands through its ranking system which would lead to the enhancement of global presence and awareness of the brands listed on the websites.

SUMMARY OF THE INVENTION

One aspect of this disclosure is to provide a ranking system which allows voting to be conducted via a voting link embedded on third-party platforms such as emails and websites including forums, social networks and blogs.

Another aspect of this disclosure is to provide a ranking system with a voting mechanism which is flexible, convenient, accurate and accountable that deters fraud voters.

Still another aspect of this disclosure is to provide a ranking system with a voting mechanism which implements value voting method.

Yet another aspect of this disclosure is to provide a ranking system which is a reliable measurement for popularity of a choice such as a brand.

Also another aspect of this disclosure is to provide a ranking system which comprises a brand centric online platform for owners to promote their brands and interact with users.

In a first aspect of the invention, there is provided a system for ranking a plurality of items comprising an online platform capable of displaying at least a list showing ranking of the items; a voting link generating module for generating a voting link that is assigned to a specific item to allow a vote to be cast thereon following a specific action performed on the voting link; a ranking engine for determining ranking of the items through updating and/or repositioning the items on the list upon receiving the vote; and one or more servers having at least one processor for managing processes executed by the system; wherein the voting link is configured to be inserted and displayed on a third-party platform managed by a third-party server to readily interact and receive the specific action for the vote to be cast on the item from one or more users browsing the third-party platform without having the user to visit the online platform of the system.

In a second aspect of the invention, there is provided a method for ranking a plurality of items using a system having one or more servers that includes at least one processor for managing processes executed by the system comprising the steps of casting a vote that is assigned to an item by a user through performing a specific action on a voting link inserted and displayed on a third-party platform which is managed by a third-party server; determining a list showing rankings of a plurality of items by a ranking engine of the system through updating and/or repositioning the items on the list upon receiving the vote; and displaying the list on an online platform of the system; wherein the voting link which is generated by a voting link generating module is configured to readily interact and receive the specific action for the vote to be cast on the item from one or more users browsing the third-party platform without having the user to visit the online platform of the system.

In the third aspect of the invention, there is provided a system for ranking a plurality of items comprises a first server; a second server; at least one product list having goods or services provided by a vendor of the third-party platform; a voting link generating module for generating a voting link that is assigned to a specific good or service on the product list to allow a vote to be cast thereon following a specific action performed on the voting link, wherein the voting link generating module is operably associated with the first server; a ranking engine for determining ranking of the specified goods or services through sorting the goods or services on the product list upon receiving the vote, wherein the ranking engine is operably associated with the second server; a service platform capable of displaying at least one list showing the ranking of the product list, wherein the service platform is managed by the second server, and wherein the voting link is configured to be inserted and displayed on the third-party platform to readily interact and receive the specific action for the vote to be cast on the goods or services of the product list from at least one logged-in user on the third-party platform without requiring the user to visit the service platform; and a processing module configured to transmit the vote cast on the third-party platform from the first server to the second server; wherein each user is associated with a user level and user points, the user points are depended on the types of user activities performed, level of user activeness and user creditability, the accumulation of the user points justifies the user level of the respective user, and each user level carries a different weight of vote value; wherein the ranking of each good or service is based on a rank value which is determined by the total value of the votes received for the corresponding good or service through a calculating module; and characterized in that any changes of the user level will automatically trigger the calculating module to perform a recalculation of the rank value of each good or service voted by the corresponding user.

Preferably, the system may further comprise an identity authentication module for deterring fake user accounts or duplicate accounts.

Preferably, the system may further comprise a voting authentication module for preventing repeated voting.

Preferably, the voting link can be in the form of any one or combination of a button, banner and a slider pop-up.

Preferably, the service platform can be any one or a combination of a website and a mobile application.

Preferably, the third-party platform can be any one or a combination of a website, email application and a mobile application.

Preferably, the voting link may have a mark thereon as an identification of the service platform.

Preferably, the service platform may comprise a profile page for an owner of each good or service to display information related to the goods or services on the product list. Preferably, the service platform may enable a plurality of activities that includes any one or combination of visiting the profile page, commenting, voting, polling, surveying, reporting spam and abuse, sharing links, logging into an account, participating in draws and contests, performing event registration or activation to be participated by the user.

DETAILED DESCRIPTION OF THE INVENTION

Figure 1:
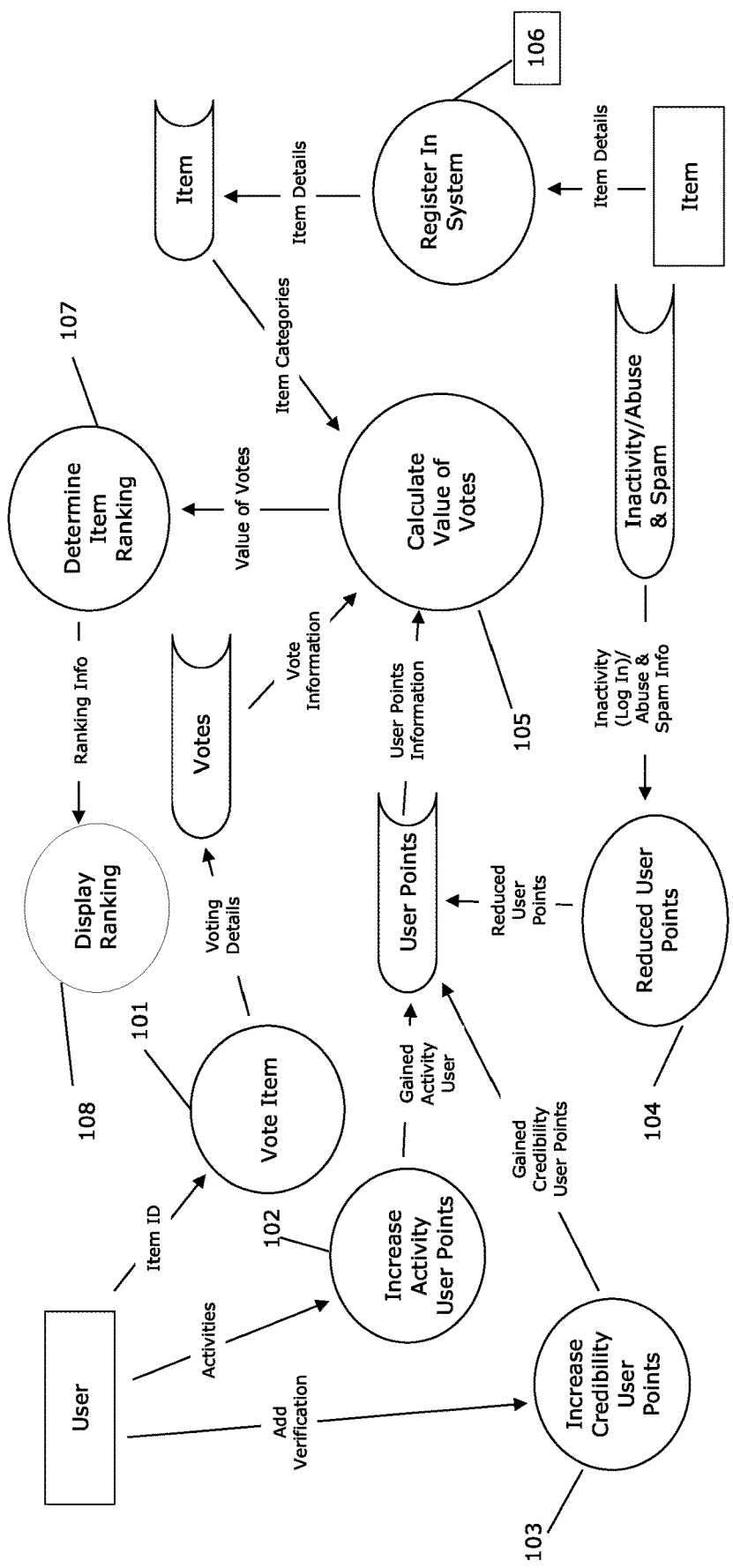
FIG. 1 shows a ranking process of an item.

This disclosure describes a system (116) for ranking a plurality of items comprising an online platform capable of displaying at least a list showing ranking of the items; a voting link generating module for generating a voting link (110) that is assigned to a specific item to allow a vote to be cast (102) thereon following a specific action (112) performed on the voting link (110); a ranking engine for determining ranking of the items (107) through updating and/or repositioning the items on the list upon receiving the vote; and one or more servers having at least one processor for managing processes executed by the system (116); wherein the voting link (110) is configured to be inserted and displayed on a third-party platform (111) managed by a third-party server to readily interact and receive the specific action (112) for the vote to be cast on the item from one or more users browsing the third-party platform (111) without having the user to visit the online platform of the system (116).

The type of items are not restricted but preferred to be brands of services and products as well as public figures, in which they are categorized according to certain criteria, such as the nature or intended purposes of the products and services; or in the case of public figures, the field, geographical locality or age range of the figures. Positioning of the items on the list (hereinafter referred to as 'ranking list') is based on votes cast by users. The term 'user' used herein indicates an individual who is a participant in the determination of the ranking results and/or a participant in the user activity provided on the online platform of the system (116). Therefore, the 'third party' having a voting link (110) on his platform (111) is also a user of the system (116). The online platform could be a website or a mobile application that allows user activities to be carried out. It should be noted that the term 'websites' include forums, social networking sites, blogs and the like that are accessible through a browser application which uses any form of web based language and is configured to receive and display graphics, multimedia and text. The servers that are computers having at least one processor are used for administering and executing functions of the engines, modules and online platform to run processes of the system (116). The servers also include memory for data storage and a network interface unit for enabling the computer to connect to the network. An interface generating module can also be included in the system (116) for generating data to be displayed on the interface of the online platform.

In the preferred embodiment, the system (116) provides an online platform having interfaces that display multiple ranking lists for various categorized items (108). The ranking lists are consistently updated within a predetermined time according to the amount of votes received for each items. Real time update is preferred for users to keep track of the items that are trending the rankings. Such feature allows users to identify the positioning of items based on their popularity among users. Consistent leaders of each category could be determined through the ranking lists which act as a leaderboard for items such as brands and public figures. For an item to be listed on the ranking list as a registered item of the system (116), the item owner can either subscribe to the services of the system (116) or be invited by the system (116) to take part in the rankings.

FIG. 1 illustrates an overall ranking process of the preferred embodiment of this disclosure, whereby the ranking results depend on votes cast by users. Preferably, the votes are each assigned a value in accordance with the user points gained or lost through activities and credibility of the users. The major feature of this disclosure lies on the voting system (116) that allows voting (101) to be performed not only on the online platform itself but also on third-party platforms (111) that are managed by third-party servers. The third-party platform (111) referred herein includes any one or a combination of a website, email application or mobile application. These third-party platforms (111) do not belong to the system (116) but are administered or possessed by the owners of the items, such as the public figure himself or a proprietor of a brand. Owners are provided with the voting link (110) assigned to their items upon registering an account (106) in the system (116). By having a voting link (110) embedded on the interfaces of the third-party platforms (111), users can conveniently cast their vote (101) through the voting link (110). Such feature also helps to direct users to the online platform of the system (116) from the third-party platforms (111) for them to view the ranking results and participate in other activities provided on the online platform.

Figure 2:
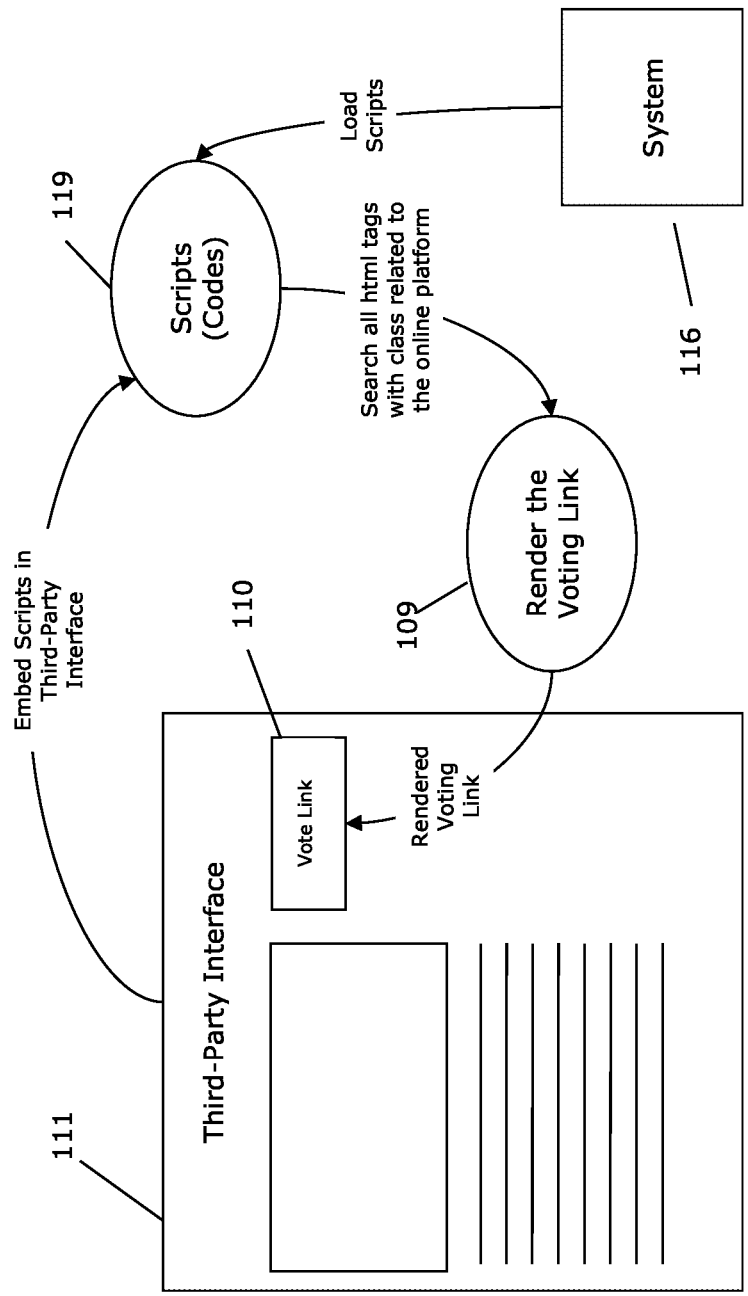
FIG. 2 shows an exemplary method to display a voting link on a third-party platform that links to the system.

As depicted in FIG. 2, the preferred way to have the voting link (110) displayed on a third-party platform (111) is through embedding a script code (119) into the third-party (111) platform. The code is in the form of JavaScript and is embedded in an HTML file of the third-party platform (111). The script loaded from the server of the system (116) contains information of the item identity. The HTML tags with class related to the online platform are searched in order to render the voting link (110). The script loads all the application programming interfaces (API) required to render (109) the voting link (110) on the third-party platform (111) and handles the voting process through submitting a vote cast (101) through an action performed on the voting link (110) to the server of the system (116). It should be noted that any methods known in the art which allows a link to be embedded into a third-party platform (111) are applicable. The script code and the APIs are examples of a processing module for sending votes from the third-party platform (111) to the system (116). The appearance and load technique of the voting link (110) could be modified for customization purposes. Whilst it is preferred that the voting link (110) is in the form of a button, it could also be in the form of a banner or slider pop-up. A mark in the form of a name or logo identifying the online platform or the system (116) is preferred to be displayed on the voting link (110).

Figure 3:
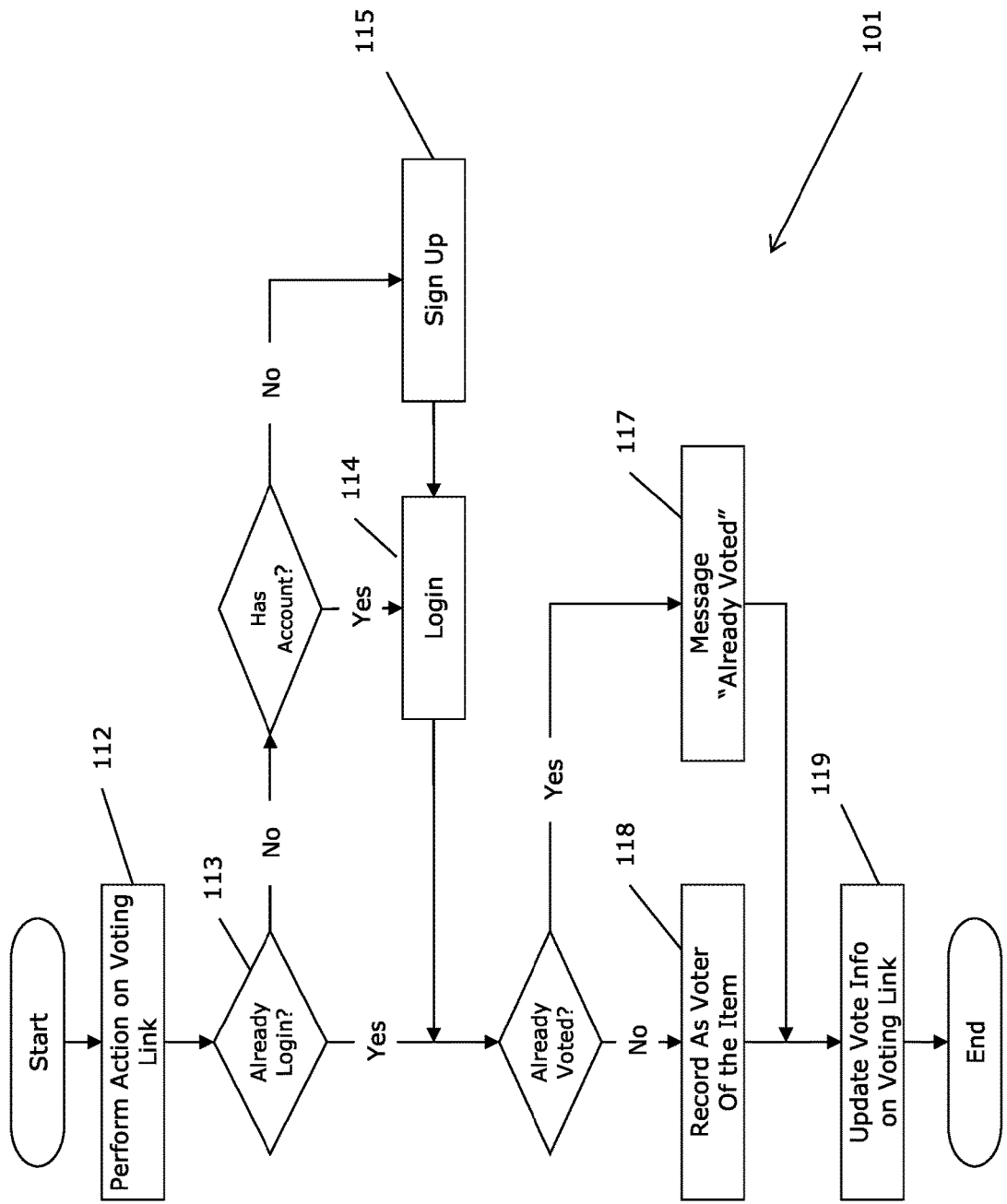
FIG. 3 shows a voting process performed on the third-party platform.

With reference to FIG. 3, the voting process is initiated through a specific action (112) performed on the voting link (110) by the user. The action (112) could be a click or a tap on the voting link (110) depending on the type of device employed by the user to browse the third-party platform (111). A request for identity authentication could be optionally set such that once the action is performed, the user would be required to sign into (114) his account which is set up in the system (116). If the user is not a member of the system (116), the user would be requested to sign up (115) for an account. In a situation where the user has voted the item previously, the voting authentication module could be configured to deter repeated votes received by the processing module from being submitted to the calculating module which is responsible for determining the value of the votes (105) by presenting a message (117) informing the user that he has voted the item before. The user is recorded as a voter of the item (118) upon his successful submission of vote. The script is then updated with the user's voting information. A processing module is configured to send the vote cast on the third-party platform (111) to the system (116) for calculating the value of the vote in order to rank the item.

Figure 4:
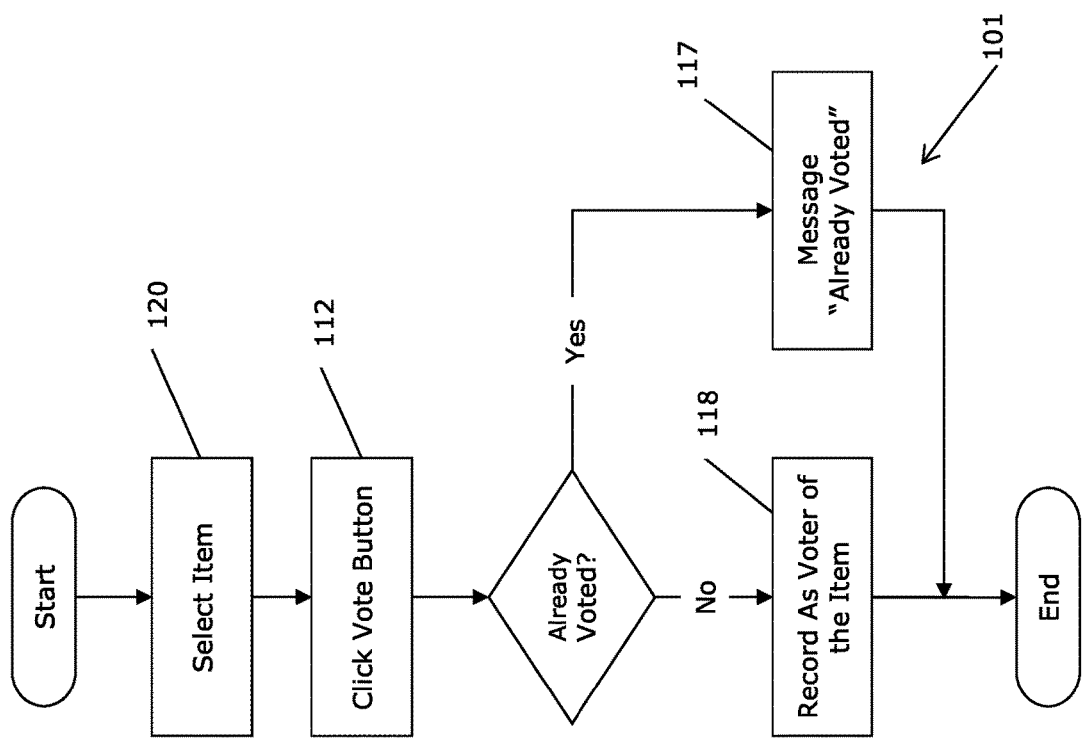
FIG. 4 shows a voting process performed on the online platform of the system.

An alternative way to carry out the voting process is through voting (101) on the online platform of the system (116) directly. This method as shown in FIG. 4 requires users to be directed to the online platform for users to vote (101) directly from the online platform while they are browsing the online platform. Users can select an item and perform the action (112) on the voting link (110) which could be in the form of a button, banner or slider pop-up. If users are required to sign into (114) their account or register (115) for an account prior to accessing the content of the online platform, they would not be requested to log into (114) their account or sign up (115) for an account once more when voting from the online platform. The votes are processed similarly as to those cast from the third-party platform (111). If the user has voted a brand before, the vote of the voter would not be processed upon being identified by the voting authentication module. Else, the voter would be recorded as a voter (118) of the item and his vote would be sent to the calculating module to determine the value of his vote (105). The ranking list of the category involving the item that the voter has voted would be updated by taking his vote into account.

The online platform is not merely a site for displaying the rankings (108) but also a place for owners of the items to build their profiles for advertising purposes and to conduct activities to encourage interaction between owners and users. Customization of the profile pages is allowable. Profile pages for owners of each item could be established to display information related to the item. The content of information is not limited to but includes images, videos, contest, lucky draw, survey and program registration.

An example of the ranking methodology can be illustrated below:

Each item rank is represent by a numeric value, hereinafter refer to as rank value. The rank value is determined by the total value of votes received from the users. Each user is associated with a user level and each user level carries a different weight of vote value. Preferably, the higher user level carries higher weight of vote value. Therefore higher level users will contribute more weight to the item they voted.

User level and vote value can be any number depends on the system (116) design. For the purpose of clarity and to avoid unnecessarily obscured, three user levels (level 1, level 2 & level 3) are illustrated in the following Table 1, where level 1 as lowest level and level 3 as highest level.

TABLE 1

User level vs vote value.

| User Level Vote Value | Vote Value |
|---|---|
| Level 1 | 1 |
| Level 2 | 4 |
| Level 3 | 9 |

The value of each user level can be assigned by the system administrator. As shown in Table 1, level 3 is associated with the highest vote value of all other available levels, level 2 is associated with the next highest vote value and level 1 is associated with the lowest vote value. Preferably, all newly joined users start off from the lowest level which is level 1.

Figure 8:
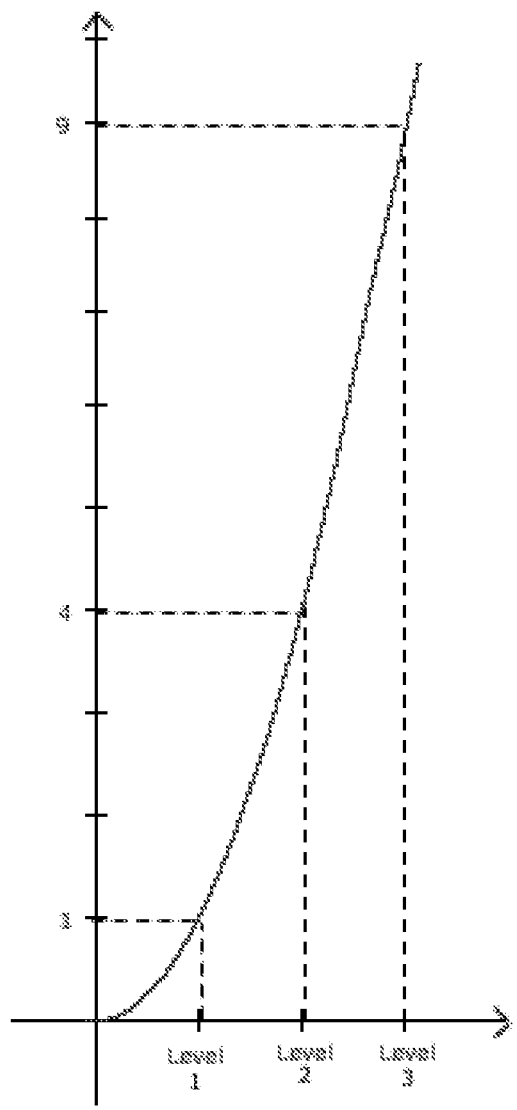
FIG. 8 shows an example of a Quadratic formula.

The relationship between the user level and the vote value can be presented using Quadratic formula ($y=x2$) where y is the vote value and x is the user level. Visual of such formula is shown in FIG. 8. The vote value determined by Quadratic formula provides significant high value for higher level users. Such value assignment gives significant strength and influences for higher level users in the ranking process. This resulting the importance of the items being voted by higher level users and also motivates the users to achieve higher user level.

The system (116) can be designed to make fake user extremely difficult to reach higher user level, rendering low influence from fake users toward the ranking process.

For example, a genuine user with user level 3 carries a total vote value of 9 will have significantly more influences in the ranking process compared to eight fake users with level 1 combined.

Each user is associated with user points. The user points can be accumulated by the user that will be used to justify the user level.

Preferably, each user level has a user point threshold as shown in Table 2 below.

TABLE 2

User point threshold corresponded to each user level.

| User Level | User Point Threshold Value Corresponded to Each User Level |
|---|---|
| Level 1 | 0 |
| Level 2 | 100,000 |
| Level 3 | 1,000,000 |

It should be noted that the values of the user point threshold can be vary and predetermined by the system administrator.

Preferably, the user level will be promoted/increased when the accumulated user points reach a higher level's user point threshold. On the other hand, the user level can be demoted/decreased when the accumulated user points drop below the current level's user point threshold.

Figure 5:
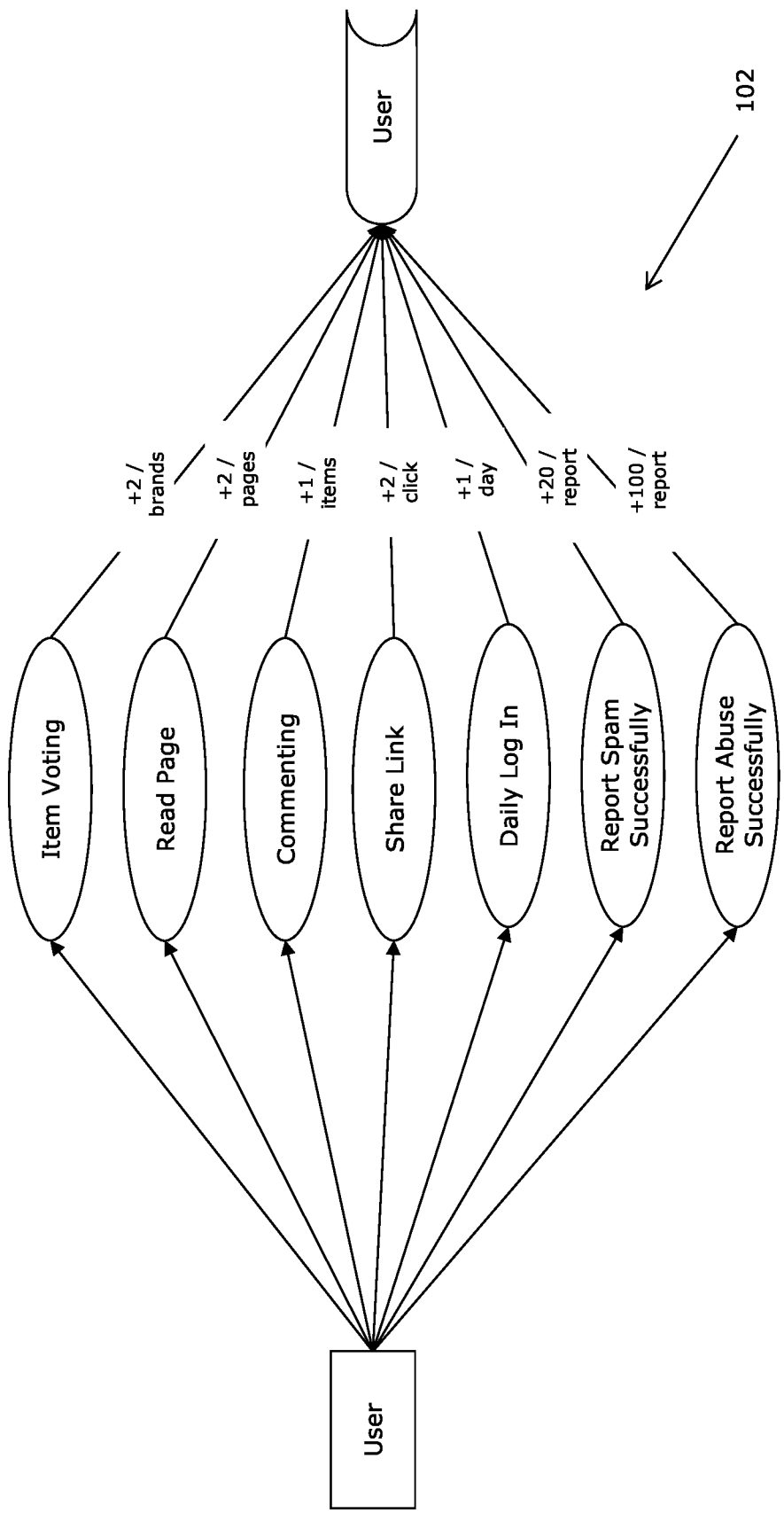
FIG. 5 shows an example of user points gained through different types of user activity performed on the system.

As stated above, the user points can be gained (102, 103) or lost (104) through activities and credibility of the users. The type of user activity performed on the system (116) and the level of user activeness on the system (116) play vital roles in determining the value of votes (105). The online platform allows activities for users to participate such as commenting, voting, polling, surveying, reporting spam and abuse, sharing links, logging into account, participating lucky draws and contests, performing event registration or activation. These activities enable user points to be gained in order to add value to increase their level. FIG. 5 illustrates an example of activity user points that could be gained (102) via participating in certain activities.

Figure 6:
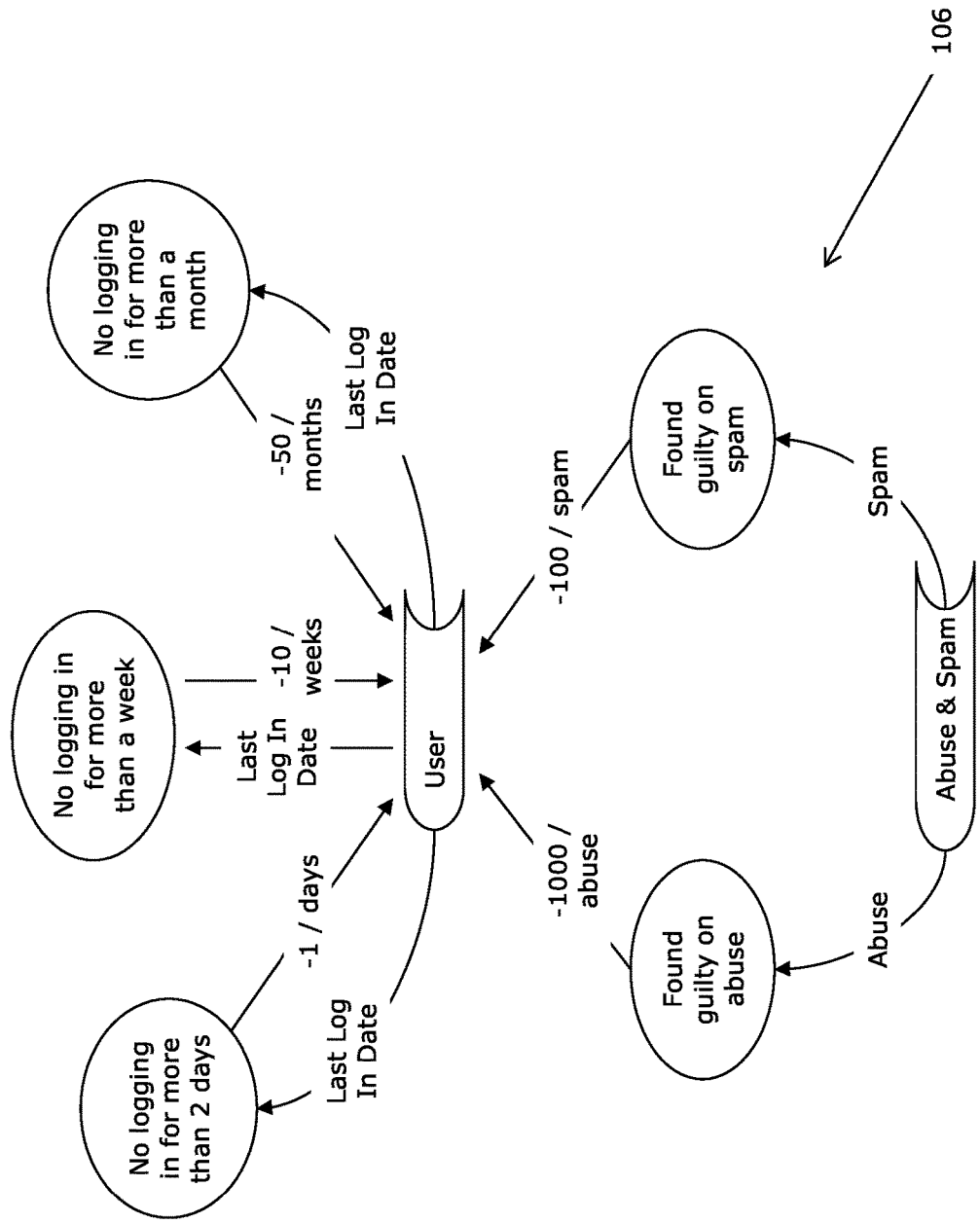
FIG. 6 shows an example of user points lost through different user activities performed on the system.

Besides gaining user points, it is also possible for depreciation in the user points to occur. This could happen if the level of user activeness has decreased such as not logging into the account for a period of time. User sign up (115), log in (114) and level of activeness are administered by an identity authentication module for deterring fake account and/or duplicate account in order to prevent fraud voting. These user activities are reported to the calculating module to determine vote value (105) of the user based on the user level/points. Also, wrongful or improper activities of users like spamming on item profile pages or abusing the services provided by the ranking system (116) could cause their points to be deducted (104), hence affecting their vote value. Examples of activities that cause depreciation of vote values to happen are depicted in FIG. 6. Administers of the system (116) could monitor the activities of users and adjust the user points via the calculating module.

Figure 7:
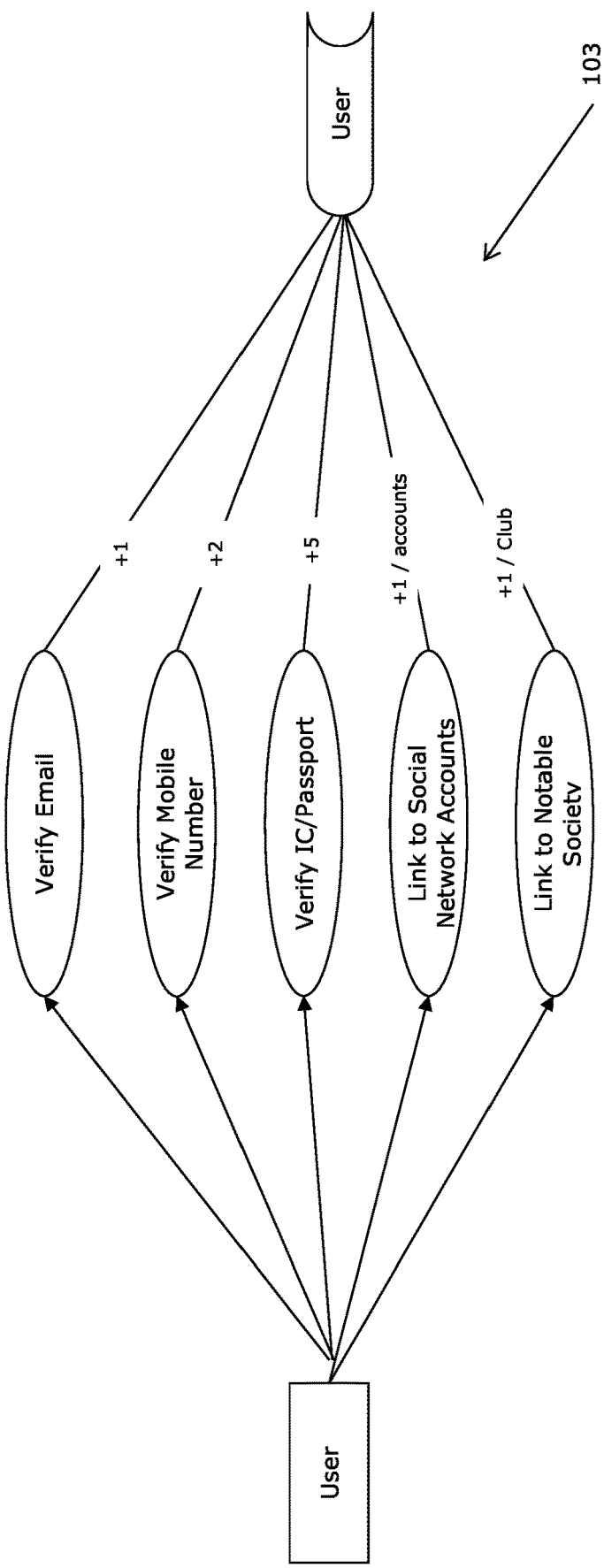
FIG. 7 shows an example of user points gained through user creditability.

Credibility of users is also a factor in determining the user points. User authentication is important in proving the validity of the user for preventing fake accounts and/or duplicate accounts of users to ensure the accountability of the ranking results. Users are allowed to verify their validity through various channels or methods such as providing their email addresses, mobile numbers, identities or passports numbers, links to their social network accounts or links notable societies that they are involved in. Credibility user points are granted to users (103) who could provide more legitimate evidence to verify themselves. FIG. 7 shows an example of credibility user points that could be gained by users (103) through various verification ways. In addition to that, credibility user points could be given to users depending on their respectability and status in the society.

The identity authentication module is responsible for reporting the credibility and level of activeness in log in activities of users to the calculating module to determine the user points. Also, the calculating module is configured to add (102) or deduct (104) user points based on certain criteria such as the number of votes cast on the items of similar categories, and/or user points gained through user activity type performed on the system (116), level of user activeness on the system (116) or user creditability. The method of determining the value of votes (105) can be varied depending on the calculation methodology adopted by the calculating module.

The calculating module runs its calculating process consistently at a predetermined time. Upon calculating the value of the votes, the information of the vote values is sent to the ranking engine by the server to update and/or reposition the items on the ranking list (107). Results of the rankings reflected on the ranking list are displayed (108) on the online platform of the system (116) and are preferably updated in real-time.

In a further embodiment, every time when a change in the user level occurs, either promoted or demoted, the system (116) will trigger the calculating module to recalculate the rank value of the items voted by the corresponding user. For example, a user A currently voted 3 items, item A, item B and item C. The user A got demoted from user level 3 to user level 2 due to non-logging in for months. The system (116) will then recalculate the rank value of item A, item B and item C. Item ranking is constantly recalculate and update whenever there is any changes in any user level to stay relevant.

In other word, the item ranking is depending on the quality of the voted users. An item rank will be improved if the users who voted the item also got user level promoted overtime. An item rank will also depreciated if the users who voted the item got level demoted.

As such, item voted by genuine users will be rewarded in ranking improvement as genuine users usually will get level promoted overtime. On the contrary, item voted by fake users, especially for that item owner who attempts to buy fake votes by hoping to boost their ranking won't be able to achieve such rank improvement as fake users are unlikely to get user level promoted. Fake users also easily demoted for being reported by other genuine user, which would have direct impacts to the ranking.

The rank value is the sum of the vote value from each users. A formula used for calculating the rank value is presented as follows:

$$R = V_1 + V_2 + \ldots + V_n$$

which R corresponds to the total rank value of an item that used to justify the ranking compare to other items. $V_n$ corresponds to vote value for $n^{th}$ voted users.

For example, in the case of calculating the rank value of 2 items, item A and item B.

Item A is voted by 8× level 1 users, 1× level 2 user and 1× level 3 user. The vote value corresponding to level 1, level 2, and level 3 are 1, 4 & 9 respectively. Thus, the rank value for item A is 1+1+1+1+1+1+1+1+4+9=21.

As for item B, it is voted by 4× level 3 users. Thus, the rank value for item B is 9+9+9+9=36. By comparing both rank values 21 and 36, 36 weight more than 21. Thus, item B is ranked higher than item A.

The example above showing that quantity of voted user is not the main factor to justify the ranking, but the quality of the voted users does.

Voting (101) from third-party platforms (111) is made possible by the invention described in this disclosure. The ranking system (116) provides additional channels for users to cast their votes (101) for items from a ranking list without the need to vote (101) from the online platform of the system (116) itself. Evaluation of the popularity and global presence of a certain item could be carried out based on the ranking results. The ranking system (116) is reliability focused and hence promotes value and quality voting. Furthermore, the online platform allows item owners to build their profiles and launch activities to promote their items as well as interact with users to receive feedback on the items. Owners of the items could also receive reports of infringement activities that may harm the business of the owners through the online platform.

Although the description above contains many specifications, it is understood that the embodiments of the preferred form are not to be regarded as a departure from the invention and it may be modified within the scope of the appended claims.

What is claimed is:

1. A system for voting and polling on a third-party platform, comprising:
 a first server;
 a second server;
 at least one product list having goods or services provided by a vendor of the third-party platform;
 a voting link generating module for generating a voting link that is assigned to specific goods or services on the product list to allow a vote to be cast thereon following a specific action performed on the voting link by one or more logged-in users, wherein the voting link generating module is operably associated with the first server;
 a ranking engine for determining ranking of the specified goods or services through sorting the goods or services on the product list upon receiving the vote, wherein the ranking engine is operably associated with the second server;
 a service platform capable of displaying at least one list showing the ranking of the product list, wherein the service platform is managed by the second server;
 wherein the voting link is configured to be inserted and displayed on the third-party platform to readily interact and receive the specific action for the vote to be cast on the goods or services of the product list from the logged-in user on the third-party platform without requiring the user to visit the service platform; and
 a processing module configured to transmit the vote cast on the third-party platform from the first server to the second server;
 wherein the vote of each logged-in user is assigned with a value and such value is depended on user points gained through user activity type, level of user activeness or user creditability.

2. The system according to claim 1, further comprising an identity authenti- cation module for deterring fake user accounts or duplicate accounts.

3. The system according to claim 1, further comprising a voting authentication module for preventing repeated voting.

4. The system according to claim 1, wherein the voting link is in the form of any one or combination of a button, banner and a slider pop-up.

5. The system according to claim 1, wherein the service platform is any one or a combination of a website and a mobile application.

6. The system according to claim 1, wherein the third-party platform is any one or a combination of a website, email application and a mobile application.

7. The system according to claim 1, wherein the voting link has a mark thereon as an identification of the service platform.

8. The system according to claim 1, further comprising a calculating module for determining the value of the vote.

9. The system according to claim 1, wherein the service platform comprises a profile page for an owner of each item to display information related to the goods or services on the product list.

10. The system according to claim 1, wherein the service platform enables a plurality of activities that includes any one or combination of visiting the profile page, commenting, voting, polling, surveying, reporting spam and abuse, sharing links, logging into an account, participating in draws and contests, performing event registration or activation to be participated by the user.

11. A method for voting and polling on a third-party platform, comprising the steps of:
providing a first server;
providing a second server;
providing at least one product list having goods or services provided by a vendor of the third-party platform;
providing a voting link generating module for generating a voting link, wherein the voting link generating module is operably associated with the first server;
casting a vote that is assigned to the goods or services on the product list by at least one user through performing a specific action on an inserted voting link by a logged-in and displayed on the third-party platform that is managed by the first server;
providing a ranking engine for determining ranking of the specified goods or services, wherein the ranking engine is operably associated with the second server;
determining ranking of the specified goods or services by the ranking engine through sorting the goods or services on the product list upon receiving the vote;
displaying the sorted goods or services on a service platform that is managed by the second server;
wherein the voting link is configured to readily interact and receive the specific action for the vote to be cast on the specific goods or services on the product list from the logged-in user browsing the third-party platform without requiring the user to visit the service platform;
providing a processing module configured to transmit the vote cast on the third-party platform from the first server to the second server; and
transmitting the vote cast on the third-party platform from the first server to the second server;
wherein the vote of each logged-in user is assigned with a value and such value is depended on user points gained through user activity type, level of user activeness or user creditability.

12. The method according to claim 11, further comprising the step of requesting user verification by an identity authentication module.

13. The method according to claim 11, further comprising the step of requesting the user to log in or sign up for an account for casting the vote upon performing an action on the link.

14. The method according to claim 11, further comprising the step of determining a value assigned to the vote by a calculating module of the system.

15. The method according to claim 11, wherein the voting link is displayed on the third-party platform through embedding a code into the third-party platform.

16. The method according to claim 11, wherein the action performed on the link is a clicking or a tapping action.

* * * * *